United States Patent
Jiang

(10) Patent No.: US 10,690,822 B2
(45) Date of Patent: Jun. 23, 2020

(54) PIXEL STRUCTURE, COLOR FILTER SUBSTRATE, AND DISPLAY PANEL

(71) Applicant: Shenzhen China Star Optoelectronics Semiconductor Display Technology Co., Ltd., Shenzhen, Guangdong (CN)

(72) Inventor: Zhixiong Jiang, Guangdong (CN)

(73) Assignee: SHENZHEN CHINA STAR OPTOELECTRONICS SEMICONDUCTOR DISPLAY TECHNOLOGY CO., LTD., Shenzhen, Guangdong (CN)

(*) Notice: Subject to any disclaimer, the term of this patent is extended or adjusted under 35 U.S.C. 154(b) by 111 days.

(21) Appl. No.: 15/773,676

(22) PCT Filed: Jan. 30, 2018

(86) PCT No.: PCT/CN2018/074598
§ 371 (c)(1),
(2) Date: May 4, 2018

(87) PCT Pub. No.: WO2019/071881
PCT Pub. Date: Apr. 18, 2019

(65) Prior Publication Data
US 2019/0107654 A1    Apr. 11, 2019

(30) Foreign Application Priority Data
Oct. 11, 2017    (CN) .......................... 2017 1 0945284

(51) Int. Cl.
*G02B 5/20*    (2006.01)

(52) U.S. Cl.
CPC .................................. *G02B 5/201* (2013.01)

(58) Field of Classification Search
CPC .............. G02B 5/201; G02F 1/133514; G02F 2201/52
(Continued)

(56) References Cited

U.S. PATENT DOCUMENTS

| 2006/0103794 | A1 | 5/2006 | Iijima | |
| 2009/0207328 | A1* | 8/2009 | Hur | G02F 1/133707 349/37 |
| 2013/0050282 | A1* | 2/2013 | Kim | G09G 3/3413 345/690 |

FOREIGN PATENT DOCUMENTS

| CN | 101149512 A | 3/2008 |
| CN | 102914905 A | 2/2013 |

(Continued)

OTHER PUBLICATIONS

CN2017109452845 First Office Action.

*Primary Examiner* — Jade R Chwasz
(74) *Attorney, Agent, or Firm* — Leong C. Lei

(57) ABSTRACT

Provided is a pixel structure, in which a white sub-pixel is inlaid in at least one sub-pixel of a plurality of sub-pixels and the white sub-pixel is arranged to distribute among multiple domain areas of the sub-pixels in which the white sub-pixel is located. The white sub-pixel is divided into a plurality of white sub-pixel sections having identical sizes. Each of the white sub-pixel sections is located in one of the domain areas so that the white sub-pixel is spread in each of the domain areas of the sub-pixel in which the white sub-pixel is located to thereby ensure uniformity of exiting light from each portion of the sub-pixel and thus enhancing consistency of transmission rate of the pixel structure.

20 Claims, 4 Drawing Sheets

(58) Field of Classification Search
USPC .......................................................... 359/891
See application file for complete search history.

(56) References Cited

FOREIGN PATENT DOCUMENTS

| | | |
|---|---|---|
| CN | 103185979 A | 7/2013 |
| CN | 103792724 A | 5/2014 |
| CN | 103809323 A | 5/2014 |
| CN | 103995379 A | 8/2014 |
| CN | 104297991 A | 1/2015 |
| CN | 105093656 A | 11/2015 |
| CN | 105096765 A | 11/2015 |
| CN | 105319764 A | 2/2016 |
| CN | 105788463 A | 7/2016 |
| EP | 1357421 A2 | 10/2003 |

* cited by examiner

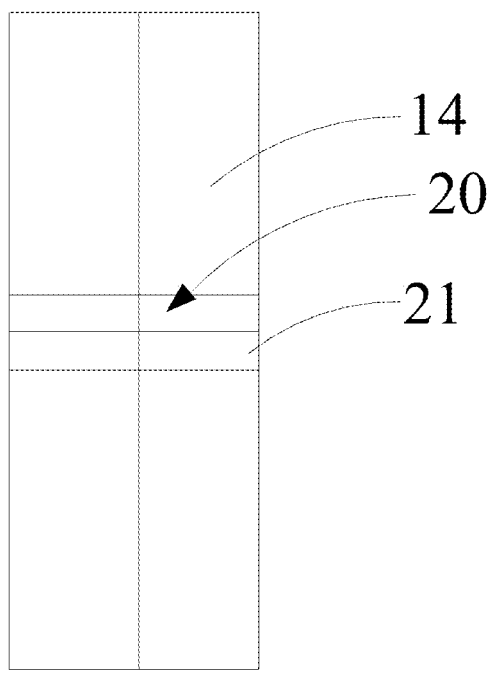
FIG. 5
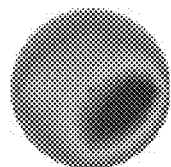 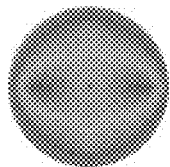 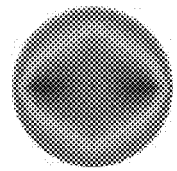 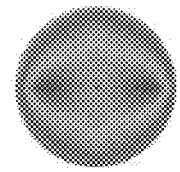 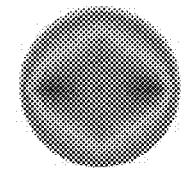
FIG. 6(a)   FIG. 6(b)   FIG. 6(c)   FIG. 6(d)   FIG. 6(e)

PIXEL STRUCTURE, COLOR FILTER SUBSTRATE, AND DISPLAY PANEL

CROSS REFERENCE TO RELATED APPLICATIONS

This application a national phase of PCT patent application number PCT/CN2018/074598 filed on Jan. 30, 2018, claiming the priority of Chinese Patent Application No. 201710945284.5 filed on Oct. 11, 2017, the disclosure of which is incorporated herein by reference in its entirety.

BACKGROUND OF THE INVENTION

1. Field of the Invention

The present invention relates to the field of display technology, and more particularly to a pixel structure, a color filter substrate, and a display panel.

2. The Related Arts

Full High Definition (FHD) panels have 1902×1080 pixels. Each of the pixels is made up of a red (R) sub-pixel, a green (G) sub-pixel, and a blue (B) sub-pixel. Ultra High Definition (UHD) panels have a resolution of 3840×2160 and the resolution of UHD is four times of that of FHD. However, pixels of high resolution may lead to lowering of light transmission rate and thus reducing brightness of a displayed image.

The state of the art additionally includes a white (W) sub-pixel on the basis of three sub-pixels of red, green, and blue to provide a RGBW pixel structure so that the light transmission rate of the panel can be increased through the addition of the white sub-pixel. However, the arrangement of the four sub-pixels of red, green, blue, and while in the RGBW pixel structure of the state of the art causes lowering of the resolution of the panel. For example, in a UHD panel, the number of pixels in a horizontal direction is 3840 so that for a RGB pixel structure, the number of the sub-pixels in the horizontal direction is 2160. For a UHD panel adopting a RGBW pixel structure, since each pixel is made up of four sub-pixels of red, green, blue, and white, the number of pixels in the horizontal direction is reduced to only 2880. On the other hand, the RGBW panel still has 2160 pixels in a vertical direction, similar to a RGB based UHD panel, and thus, the resolution of the UHD panel is lowered. Further, in the state of the art, to ensure the resolution of the UHD panel is not changed, the white (W) sub-pixel is arranged on at least one of the three sub-pixels of red, green, and blue so as to ensure the resolution of the panel is kept unchanged, while sufficient image brightness can be provided. However, in the state of the art, the location of the white sub-pixel provided on the sub-pixels is arbitrary and the white sub-pixels may be generally concentrated on the same area of the sub-pixels so as to cause inconsistency of transmission rate for full view angle of the panel and light exiting the panel being not uniform. Referring to FIG. 1, which shows an example of the prior art, in which sub-pixels are each arranged as a four-domain configuration, the white sub-pixel 20 is inlaid in the sub-pixels and the white sub-pixels 20 are all set in one of the domains of the sub-pixels. Additional reference being had to FIG. 6(a), a result of simulation of transmission rate for full view angle of the sub-pixels for the prior art example is provided, revealing transmission rate at the location where the white sub-pixel 20 is inlaid in the sub-pixels would be increased. When the white sub-pixels 20 are all set in one of the domains of the sub-pixels, severe brightness shifting may occur at the location where the white sub-pixel 20 is set so that the transmission rate of the sub-pixels for full view angle would become non-uniform, whereby a pixel structure that include multiple sub-pixels would suffer non-uniform transmission rate and thus, the exiting light of a panel would become non-uniform.

SUMMARY OF THE INVENTION

The present invention provides a pixel structure that helps improve consistency of transmission rate of the pixel structure.

The pixel structure comprises a plurality of pixel units arranged in an array. Each of the pixel units comprises a red sub-pixel, a green sub-pixel, a blue sub-pixel, and a white sub-pixel, wherein the white sub-pixel is inlaid in at least one sub-pixel of the red sub-pixel, the green sub-pixel, and the blue sub-pixel, and the red sub-pixel, the green sub-pixel, and the blue sub-pixel are each of a multiple-domain structure that comprises multiple domain areas; the white sub-pixel is distributed in the multiple domain areas of the one of the sub-pixels in which the white sub-pixel is arranged, the white sub-pixel being divided into a plurality of white sub-pixel sections having identical sizes, each of the white sub-pixel sections being associated with and located in one of the domain areas.

In the above, two adjacent ones of the white sub-pixel sections are set in the ones of the domain areas associated therewith at locations that are symmetric to each other.

In the above, each one of the white sub-pixel sections is set in the one of the domain areas associated therewith at a location that is identical to locations of the other ones of the white sub-pixel sections set in the ones of the domain areas respectively associated therewith.

In the above, the red sub-pixel, the green sub-pixel, and the blue sub-pixel are each of a four-domain structure and the white sub-pixel is distributed to be located in each of the domain areas of the one of the sub-pixels in which the white sub-pixel is located.

In the above, the red sub-pixel, the green sub-pixel, and the blue sub-pixel are each of an eight-domain structure, which comprises two four-domain structures connected with each other, wherein the white sub-pixel is distributed in each of the domain areas of one of the four-domain structure of the one of the sub-pixels in which the white sub-pixel is located, or alternatively, the white sub-pixel is distributed in each of the domain areas of the one of the sub-pixels in which the white sub-pixel is located.

In the above, each of the white sub-pixel sections is set at a central position of the one of the domain areas in which the white sub-pixel section is located.

In the above, each of the white sub-pixel sections is set along an edge of the one of the domain areas in which the white sub-pixel section is located, the plurality of white sub-pixel sections being not connected with each other.

In the above, each of the white sub-pixel sections is set along an edge of the one of the domain areas in which the white sub-pixel section is located, the plurality of white sub-pixel sections being connected together to form an integrated unitary body, such that the integrated unitary body of the plurality of white sub-pixel sections so connected has a symmetric center that is coincident with a symmetric center of the one of the sub-pixels in which the white sub-pixel is located.

In the above, the one of the sub-pixels in which the white sub-pixel is located is formed with a through hole and the white sub-pixel is arranged in the through hole.

In the above, the white sub-pixel is inlaid in the red sub-pixel, the green sub-pixel and the blue sub-pixel.

The present invention also provides a color filter substrate, which comprises a substrate and the above-described pixel structure. The pixel structure is arranged on the substrate.

The present invention provides a pixel structure, in which a white sub-pixel is arranged to distribute among multiple domain areas of a sub-pixel in which the white sub-pixel is located. The white sub-pixel is divided into a plurality of white sub-pixel sections having identical sizes. Each of the white sub-pixel sections is located in one of the domain areas so that the white sub-pixel is spread in each of the domain areas of the sub-pixel in which the white sub-pixel is located to thereby ensure uniformity of exiting light from each portion of the sub-pixel and thus enhancing consistency of transmission rate of the pixel structure.

BRIEF DESCRIPTION OF THE DRAWINGS

To more clearly explain the technical solution proposed in an embodiment of the present invention and that of the prior art, a brief description of the drawings that are necessary for describing the embodiment or the prior art is given as follows. It is obvious that the drawings that will be described below show only some embodiments of this application. For those having ordinary skills of the art, other drawings may be readily available from these attached drawings without the expense of creative effort and endeavor.

FIG. 5 is a schematic view illustrating a sub-pixel structure according to yet a further embodiment of the present invention;

FIG. 6(*a*) is a diagram of simulation for full view angle transmission rate of the sub-pixel shown in FIG. 1;

FIG. 6(*b*) is a diagram of simulation for full view angle transmission rate of the sub-pixel shown in FIG. 2;

FIG. 6(*c*) is a diagram of simulation for full view angle transmission rate of the sub-pixel shown in FIG. 3;

FIG. 6(*d*) is a diagram of simulation for full view angle transmission rate of the sub-pixel shown in FIG. 4;

FIG. 6(*e*) is a diagram of simulation for full view angle transmission rate of the sub-pixel shown in FIG. 5;

DETAILED DESCRIPTION OF THE PREFERRED EMBODIMENTS

A clear and complete description will be given to technical solutions provided by embodiments of the present invention with reference to the attached drawings of the embodiments of the present invention. However, the embodiments so described are only some, but not all, of the embodiments of the present invention. Based on the embodiment of the present invention, other embodiments are available to those having ordinary skills of the art without the expense of creative effort and endeavor and are considered belonging to the scope of protection of the present invention.

Figure 1:
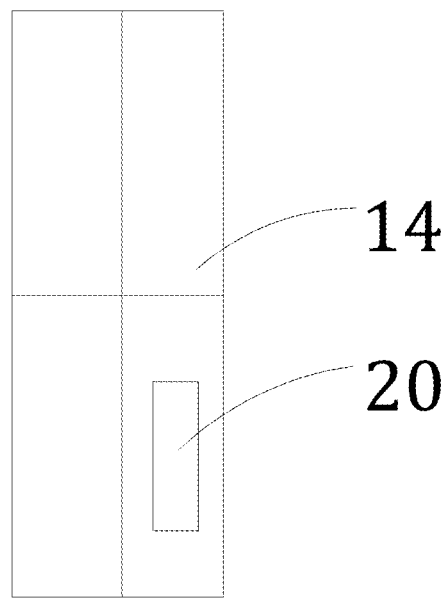
FIG. 1 is a schematic view illustrating a sub-pixel structure of prior art.
Figure 2:
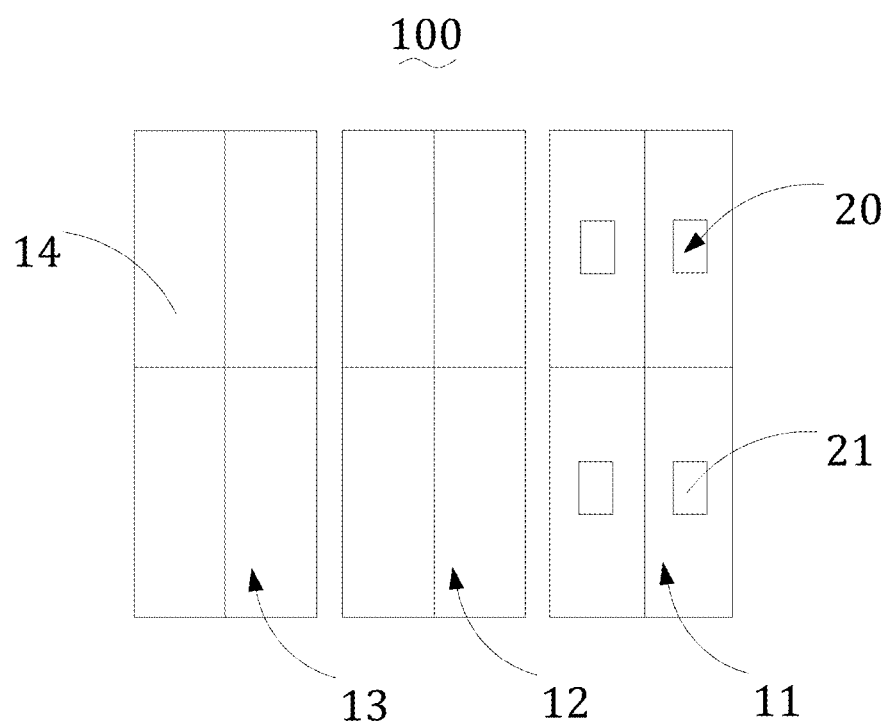
FIG. 2 is a schematic view illustrating a sub-pixel structure according to an embodiment of the present invention.

Referring to FIG. 2, the present invention provides a pixel structure. The pixel structure comprises a plurality of pixel units 100 arranged in an array. In the instant embodiment, each of the pixel units 100 comprises three sub-pixels. The three sub-pixels are respectively a red sub-pixel 11, a green sub-pixel 12, and a blue sub-pixel 13. Each of the pixel units 100 further comprises a white sub-pixel 20. The white sub-pixel 20 is inlaid in at least one sub-pixel of the three sub-pixels. In the instant embodiment, the sub-pixel in which the white sub-pixel 20 is arranged is provided with a through hole and the white sub-pixel 20 is deposited in the through hole in order to achieve inlaying of the white sub-pixel 20 in the sub-pixel.

The red sub-pixel 11, the green sub-pixel 12 and the blue sub-pixel 13 are arranged in an array and are arranged in parallel with each other. In the instant embodiment, the red sub-pixel 11, the green sub-pixel 12 and the blue sub-pixel 13 are each of a rectangular shape. It is appreciated that the sub-pixels can alternatively be of a triangular shape, a rhombic shape, or other shapes. Multiple ones of the sub-pixels may each be of a multiple-domain structure. In other words, the red sub-pixel 11, the green sub-pixel 12, and the blue sub-pixel 13 each comprise multiple domain areas 14 that arranged in an array. Further, the white sub-pixel 20 is distributed in the multiple domain areas 14 of the sub-pixel in which it is arranged.

The white sub-pixel 20 is inlaid in at least one sub-pixel of the three sub-pixels. In the instant embodiment, the white sub-pixel 20 is inlaid only in the blue sub-pixel 13. It is appreciated that in each of the pixel units 100, the white sub-pixel 20 can be inlaid in any one or two or three of the red sub-pixel 11, the green sub-pixel 12, and the blue sub-pixel 13. For example, the white sub-pixel 20 can be inlaid in the red sub-pixel 11; or can alternatively be inlaid in both the blue sub-pixel 13 and the red sub-pixel 11; or can alternatively be inlaid in all the red sub-pixel 11, the green sub-pixel 12, and the blue sub-pixel 13. The white sub-pixel 20 is divided into a plurality of white sub-pixel sections 21 of the same size. Each one of the white sub-pixel sections 21 is arranged in one of the domain areas 14. Thus, the white sub-pixel 20 may be spread over each of the domain areas of the sub-pixel in which it is provided and the white sub-pixel section 21 located in each of said domain areas has the same size so as to ensure uniformity of exiting light of the sub-pixel in all portions thereof to thereby further enhance uniformity of transmission rate of the pixel structure. Further, for any two adjacent white sub-pixel sections, the locations that they are set in the domain areas are symmetric so that the exiting light from each of the domain areas 14 is made consistent to thereby further enhance uniformity of exiting light from each portion of the sub-pixel. In one embodiment, as shown in FIG. 2, the location of any one of the white sub-pixel sections 21 in the domain area 14 associated therewith is identical to the locations of the other ones of the white sub-pixel sections 21 in the respective ones of the domain areas 14 associated therewith.

In the instant embodiment, in each of the pixel units 100, the red sub-pixel 11, the green sub-pixel 12, and the blue sub-pixel 13 are each of a four-domain structure. In other words, the red sub-pixel 11, the green sub-pixel 12, and the blue sub-pixel 13 each comprises four domain areas 14 arranged in an array. The white sub-pixel 20 is divided into four white sub-pixel sections 21. Each of the white sub-pixel sections 21 is associated with a respective one of the domain areas 14 of the blue sub-pixel 13 and is located at a central position of the respective one of the domain areas 14 in which it is located. Also, the white sub-pixel sections 21 are not connected with each other.

Figure 3:
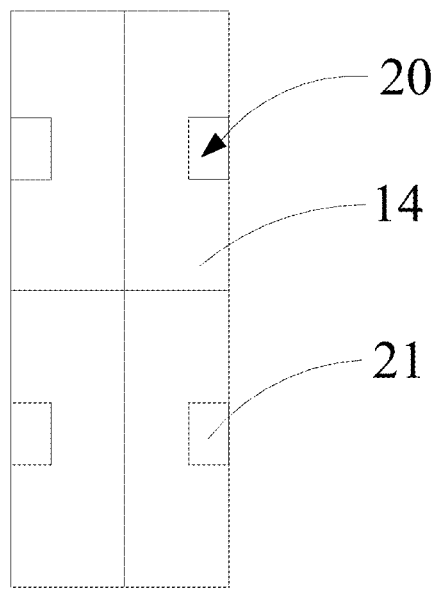
FIG. 3 is a schematic view illustrating a sub-pixel structure according to another embodiment of the present invention.

Referring to FIG. 3, another embodiment of the present invention is provided, which is different from the sub-pixels of the embodiment of FIG. 2 is that the white sub-pixel sections 21 are each arranged at an edge portion of a respective one of the domain areas 14 of the sub-pixel in which it is located and are not connected with each other. Also, the four white sub-pixel sections 21 are arranged to circumferentially define a rectangular configuration. The configuration has a symmetric center that is coincident with a symmetric center of the sub-pixel in which the white sub-pixel 20 is provided. It is appreciated that the white sub-pixel sections 21 may be alternatively arranged at any desired location along the edges of the domain areas 14 associated therewith.

Figure 4:
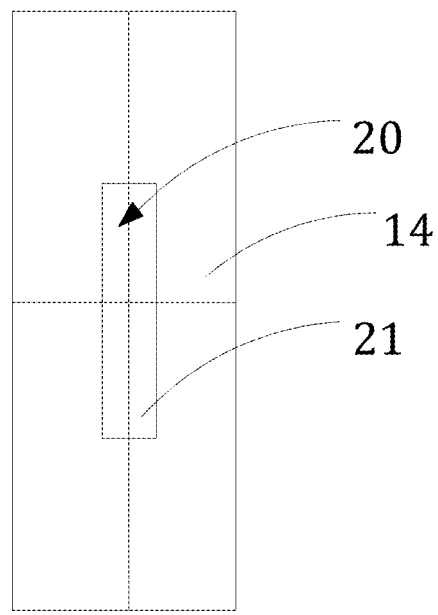
FIG. 4 is a schematic view illustrating a sub-pixel structure according to a further embodiment of the present invention.

Referring to FIG. 4, a further embodiment of the present invention is provided, which is different from the sub-pixels of the embodiment of FIG. 3 is that the white sub-pixel sections 21 are each arranged at an edge portion of each one of the domain areas 14 and are connected together as an integrated unitary body. The four white sub-pixel sections 21 have a symmetric center that is coincident with a symmetric center of the sub-pixel in which the white sub-pixel 21 is provided. In the instant embodiment, the white sub-pixel sections 21 are arranged to have a quantity of four and the four white sub-pixel sections 21 are each located at a corner of each of the four domain areas. The four white sub-pixel sections 21 are connected to each other as an integrated unitary body. The integrated unitary body formed by connecting the four white sub-pixel sections 21 is located at a central position of the sub-pixel.

Referring to FIG. 5, a further embodiment of the present invention is provided, which is different from the sub-pixels of the embodiment of FIG. 4 is that the four white sub-pixel sections 21 are respectively arranged alongside an edge of each of the four domain areas and the four white sub-pixel sections 21 are connected together to form an integrated unitary body. The integrated unitary body formed by connecting the four white sub-pixel sections 21 is located at a middle portion of the sub-pixel and divide the sub-pixel into an upper segment, a middle segment, and a lower segment.

Referring to FIGS. 6(b)-6(e), which are diagrams of simulation for full view angle transmission rate of the embodiment of the present invention shown in FIGS. 2-5. Comparison with a diagram of simulation for full view angle transmission rate of a prior art example shown in FIG. 6(a) reveals that the sub-pixel according to the present invention exhibits a light transmission rate of higher uniformity in each portion thereof than the light transmission rate of the sub-pixel of the prior art and does not incur severe brightness shifting.

Figure 7:
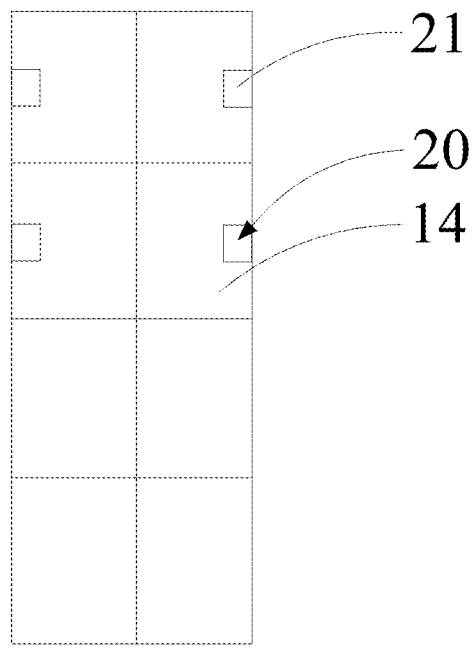
FIG. 7 is a schematic view illustrating a sub-pixel structure according to yet a further embodiment of the present invention.
Figure 8:
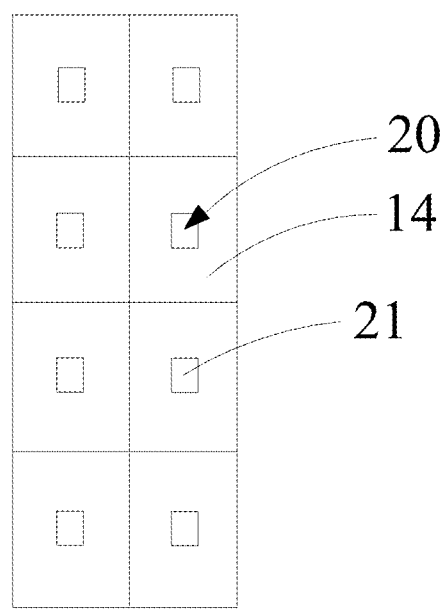
FIG. 8 is a schematic view illustrating a sub-pixel structure according to yet a further embodiment of the present invention.

Referring to FIG. 7, it is appreciated in other embodiments, the red sub-pixel 11, the green sub-pixel 12, and the blue sub-pixel 13 can alternatively be each of an eight-domain structure. The eight-domain structure comprises eight domain areas 14, and the eight domain areas 14 are divided into two groups. The domain areas 14 of each group provide a structure that is identical to that of the previously discussed four-domain structure. In other words, the eight-domain structure is equivalent to two four-domain structures combined or jointed with each other. The white sub-pixel 20 is uniformly spread in any one four-domain structure of the two four-domain structures of the sub-pixel and the white sub-pixel 20 is uniformly spread in each of the domain areas 14 of the four-domain structure. In other words, the white sub-pixel 20 comprises four white sub-pixel sections 21 having identical shape and structure. The white sub-pixel sections 21 are respectively associated with the domain areas in which the white sub-pixel is spread and are respectively located at the central position of each of the domain areas. It is appreciated that similar to the cases where the red sub-pixel 11, the green sub-pixel 12, and the blue sub-pixel 13 are of a four-domain structure, the white sub-pixel sections 21 can be arranged at other locations in the domain areas 14. Or alternatively, referring to FIG. 8, the white sub-pixel 20 may be uniformly spread over each domain area 14 of the sub-pixel that has eight domain areas. In other words, the white sub-pixel 20 comprises eight white sub-pixel sections 21, and the white sub-pixel sections 21 correspond, in a one-to-one manner, to the domain areas 14 in which the white sub-pixel is arranged and are located at central positions of the domain areas 14. It is appreciated that similar to the cases where the red sub-pixel 11, the green sub-pixel 12, and the blue sub-pixel 13 are of a four-domain structure, the white sub-pixel sections 21 can be arranged at other locations in the domain areas 14. Since light may show increased transmission rate when passing through a white sub-pixel 20, uniformly distributing the white sub-pixel over the domain areas 14 of a sub-pixel would increase the light transmission rate of the sub-pixel and at the same time improve uniformity of exiting light from each portion of the sub-pixel to thereby improve uniformity of light transmission.

The present invention also provides a color filter substrate, which comprises a substrate and the above-described pixel structure 100, wherein the pixel structure is arranged on the substrate.

The present invention further provides a display panel, which comprises an array substrate, the above-described color filter substrate, and a liquid crystal layer arranged between the array substrate and the color filter substrate. The array substrate and the color filter substrate are arranged opposite to each other and the pixel structure 100 faces toward the array substrate. Light emitting from a backlight source transmits through the pixel structure 100 to provide exit light. In the present invention, since each sub pixel of a pixel structure 100 possesses light transmission rate of enhanced uniformity, the display panel may exhibit uniform exiting light.

The above discloses just one preferred embodiment of the present invention and should not be regarded as constraint to the scope of right of the present invention. Those having ordinary skill in the field may appreciate that equivalent modifications that are employed to realize all or a part of the flow of the above-described embodiment and are made according to the appended claims of the present invention are considered belonging to the scope covered by the present invention.

What is claimed is:

1. A pixel structure, comprising a plurality of pixel units arranged in an array, each of the pixel units comprising a red sub-pixel, a green sub-pixel, a blue sub-pixel, and a white sub-pixel, wherein the white sub-pixel is inlaid in at least one sub-pixel of the red sub-pixel, the green sub-pixel, and the blue sub-pixel, and the red sub-pixel, the green sub-pixel, and the blue sub-pixel are each of a multiple-domain structure that comprises multiple domain areas; the white sub-pixel is distributed in the multiple domain areas of the one of the sub-pixels in which the white sub-pixel is arranged, the white sub-pixel being divided into a plurality of white sub-pixel sections having identical sizes, each of the white sub-pixel sections being associated with and located in one of the domain areas;

wherein in each of the pixel units that is formed of the red sub-pixel, the green sub-pixel, the blue sub-pixel, and the white sub-pixel, the at least one sub-pixel of the red sub-pixel, the green sub-pixel, the blue sub-pixel has a single integrated single area that comprises multiple domain areas of one single color, and the white sub-pixel comprises the plurality of sub-pixel sections that are separate parts of the white sub-pixel, the separate parts of the white sub-pixel being respectively arranged in the multiple domain areas of the single integrated area of the at least one sub-pixel of the red sub-pixel, the green sub-pixel, the blue sub-pixel.

2. The pixel structure according to claim 1, wherein two adjacent ones of the white sub-pixel sections are set in the ones of the domain areas associated therewith at locations that are symmetric to each other.

3. The pixel structure according to claim 2, wherein each one of the white sub-pixel sections is set in the one of the domain areas associated therewith at a location that is identical to locations of the other ones of the white sub-pixel sections set in the ones of the domain areas respectively associated therewith.

4. The pixel structure according to claim 2, wherein the red sub-pixel, the green sub-pixel, and the blue sub-pixel are each of a four-domain structure and the white sub-pixel is distributed to be located in each of the domain areas of the one of the sub-pixels in which the white sub-pixel is located.

5. The pixel structure according to claim 4, wherein each of the white sub-pixel sections is set at a central position of the one of the domain areas in which the white sub-pixel section is located.

6. The pixel structure according to claim 4, wherein each of the white sub-pixel sections is set along an edge of the one of the domain areas in which the white sub-pixel section is located, the plurality of white sub-pixel sections being not connected with each other.

7. The pixel structure according to claim 4, wherein each of the white sub-pixel sections is set along an edge of the one of the domain areas in which the white sub-pixel section is located, the plurality of white sub-pixel sections being connected together to form an integrated unitary body, such that the integrated unitary body of the plurality of white sub-pixel sections so connected has a symmetric center that is coincident with a symmetric center of the one of the sub-pixels in which the white sub-pixel is located.

8. The pixel structure according to claim 2, wherein the red sub-pixel, the green sub-pixel, and the blue sub-pixel are each of an eight-domain structure, which comprises two four-domain structures connected with each other, wherein the white sub-pixel is distributed in each of the domain areas of one of the four-domain structure of the one of the sub-pixels in which the white sub-pixel is located, or alternatively, the white sub-pixel is distributed in each of the domain areas of the one of the sub-pixels in which the white sub-pixel is located.

9. The pixel structure according to claim 8, wherein each of the white sub-pixel sections is set at a central position of the one of the domain areas in which the white sub-pixel section is located.

10. The pixel structure according to claim 8, wherein each of the white sub-pixel sections is set along an edge of the one of the domain areas in which the white sub-pixel section is located, the plurality of white sub-pixel sections being not connected with each other.

11. The pixel structure according to claim 8, wherein each of the white sub-pixel sections is set along an edge of the one of the domain areas in which the white sub-pixel section is located, the plurality of white sub-pixel sections being not connected with each other.

12. The pixel structure according to claim 1, wherein the one of the sub-pixels in which the white sub-pixel is located is formed with a through hole and the white sub-pixel is arranged in the through hole.

13. A color filter substrate, comprising a substrate and a pixel structure, the pixel structure being arranged on the substrate, the pixel structure comprising a plurality of pixel units arranged in an array, each of the pixel units comprising a red sub-pixel, a green sub-pixel, a blue sub-pixel, and a white sub-pixel, wherein the white sub-pixel is inlaid in at least one sub-pixel of the red sub-pixel, the green sub-pixel, and the blue sub-pixel, and the red sub-pixel, the green sub-pixel, and the blue sub-pixel are each of a multiple-domain structure that comprises multiple domain areas; the white sub-pixel is distributed in the multiple domain areas of the one of the sub-pixels in which the white sub-pixel is arranged, the white sub-pixel being divided into a plurality of white sub-pixel sections having identical sizes, each of the white sub-pixel sections being associated with and located in one of the domain areas;

wherein in each of the pixel units that is formed of the red sub-pixel, the green sub-pixel, the blue sub-pixel, and the white sub-pixel, the at least one sub-pixel of the red sub-pixel, the green sub-pixel, the blue sub-pixel has a single integrated single area that comprises multiple domain areas of one single color, and the white sub-pixel comprises the plurality of sub-pixel sections that are separate parts of the white sub-pixel, the separate parts of the white sub-pixel being respectively arranged in the multiple domain areas of the single integrated area of the at least one sub-pixel of the red sub-pixel, the green sub-pixel, the blue sub-pixel.

14. The color filter substrate according to claim 13, wherein two adjacent ones of the white sub-pixel sections are set in the ones of the domain areas associated therewith at locations that are symmetric to each other.

15. The color filter substrate according to claim 14, wherein each one of the white sub-pixel sections is set in the one of the domain areas associated therewith at a location that is identical to locations of the other ones of the white sub-pixel sections set in the ones of the domain areas respectively associated therewith.

16. The color filter substrate according to claim 14, wherein the red sub-pixel, the green sub-pixel, and the blue sub-pixel are each of a four-domain structure and the white sub-pixel is distributed to be located in each of the domain areas of the one of the sub-pixels in which the white sub-pixel is located.

17. The color filter substrate according to claim 14, wherein the red sub-pixel, the green sub-pixel, and the blue sub-pixel are each of an eight-domain structure, which comprises two four-domain structures connected with each other, wherein the white sub-pixel is distributed in each of the domain areas of one of the four-domain structure of the one of the sub-pixels in which the white sub-pixel is located, or alternatively, the white sub-pixel is distributed in each of the domain areas of the one of the sub-pixels in which the white sub-pixel is located.

18. The color filter substrate according to claim 17, wherein each of the white sub-pixel sections is set at a central position of the one of the domain areas in which the white sub-pixel section is located.

19. The color filter substrate according to claim 17, wherein each of the white sub-pixel sections is set along an edge of the one of the domain areas in which the white sub-pixel section is located, the plurality of white sub-pixel sections being not connected with each other.

20. The color filter substrate according to claim 17, wherein each of the white sub-pixel sections is set along an edge of the one of the domain areas in which the white sub-pixel section is located, the plurality of white sub-pixel sections being connected together to form an integrated unitary body, such that the integrated unitary body of the plurality of white sub-pixel sections so connected has a symmetric center that is coincident with a symmetric center of the one of the sub-pixels in which the white sub-pixel is located.

* * * * *